(12) United States Patent
Longeru et al.

(10) Patent No.: US 11,492,840 B2
(45) Date of Patent: Nov. 8, 2022

(54) TOWER SEGMENT AND MANUFACTURING METHOD

(71) Applicant: Wobben Properties GmbH, Aurich (DE)

(72) Inventors: Markus Longeru, Stade (DE); Andre Pubanz, Amersfoort (NL); Albert Waaijenberg, Barneveld (NL); Henk Lagerweij, Kootwijkerbroek (NL); Aart van de Pol, Otterlo (NL)

(73) Assignee: Wobben Properties GmbH, Aurich (DE)

( * ) Notice: Subject to any disclaimer, the term of this patent is extended or adjusted under 35 U.S.C. 154(b) by 39 days.

(21) Appl. No.: 16/950,451

(22) Filed: Nov. 17, 2020

(65) Prior Publication Data
US 2021/0156188 A1    May 27, 2021

(30) Foreign Application Priority Data

Nov. 21, 2019   (DE) .......................... 102019131515.8

(51) Int. Cl.
*E06B 1/12*    (2006.01)
*F03D 13/20*   (2016.01)
(Continued)

(52) U.S. Cl.
CPC .............. *E06B 1/12* (2013.01); *E04H 12/08* (2013.01); *E06B 1/006* (2013.01); *E06B 1/52* (2013.01); *E06B 1/6015* (2013.01); *F03D 13/20* (2016.05)

(58) Field of Classification Search
CPC . E04H 12/08; E06B 1/006; E06B 1/12; E06B 1/52; E06B 1/6015; F03D 13/20;
(Continued)

(56) References Cited

U.S. PATENT DOCUMENTS 5,847,318 A * 12/1998 Chapman .............. E04H 12/003
                                              174/45 R
6,532,700 B1 * 3/2003 Maliszewski ........... F03D 13/10
                                              174/45 R
(Continued)

FOREIGN PATENT DOCUMENTS

CN    202380931 U    8/2012
CN    201786578 U   10/2020
(Continued)

OTHER PUBLICATIONS

Erich Hau, Kapitel 12: Turm und Fundament—*Windkraftanlagen*, 6th edition, Springer-Verlag, Jun. 2016, pp. 515-531 (with machine English translation "Wind turbines", 42 pages).

*Primary Examiner* — James M Ference
(74) *Attorney, Agent, or Firm* — Seed Intellectual Property Law Group LLP (57) ABSTRACT

A tower segment, in particular for a tower of a wind turbine, a wind turbine, and a method for manufacturing a tower segment is provided. A tower segment, in particular for a tower of a wind turbine, comprising a casing segment with an inner casing surface, an outer casing surface and a cutout for a door, wherein the inner casing surface has a first inner reinforcing portion and/or the outer casing surface has an outer reinforcing portion, wherein the inner reinforcing portion and/or the outer reinforcing portion adjoin the cutout, and the inner reinforcing portion has an inner reinforcing plate and/or the outer reinforcing portion has an outer reinforcing plate.

19 Claims, 8 Drawing Sheets

(51) Int. Cl.
  *E04H 12/08* (2006.01)
  *E06B 1/00* (2006.01)
  *E06B 1/52* (2006.01)
  *E06B 1/60* (2006.01)

(58) Field of Classification Search
  CPC .... F05B 2230/50; Y02E 10/72; Y02E 10/728; Y02P 70/50
  See application file for complete search history.

(56) References Cited

U.S. PATENT DOCUMENTS

| | | | | |
|---|---|---|---|---|
| 8,109,061 | B2* | 2/2012 | Kristensen | E04H 12/003 52/843 |
| 8,171,674 | B2* | 5/2012 | Bagepalli | F03D 13/20 52/651.01 |
| 8,209,913 | B2* | 7/2012 | Murata | E04H 12/08 52/844 |
| 8,227,932 | B2* | 7/2012 | Murata | F03D 9/25 290/55 |
| 8,482,149 | B2* | 7/2013 | Uphues | F03D 80/00 290/55 |
| 9,175,491 | B2* | 11/2015 | Gawrisch | F03D 13/20 |
| 9,279,266 | B2* | 3/2016 | Unanua Hermoso De Mendoza | F03D 80/50 |
| 9,416,511 | B2* | 8/2016 | Kramer | B23K 31/02 |
| 9,903,150 | B2* | 2/2018 | De Los Rios Leiva | F03D 13/20 |
| 10,330,088 | B2* | 6/2019 | Øllgaard | F03D 13/10 |
| 2006/0005505 | A1* | 1/2006 | Somers | E04H 12/003 40/606.03 |
| 2006/0225379 | A1* | 10/2006 | Seidel | E04H 12/08 52/745.04 |
| 2006/0236648 | A1* | 10/2006 | Grundman | F03D 13/20 52/848 |
| 2007/0125037 | A1* | 6/2007 | Meiners | F03D 13/22 52/848 |
| 2008/0034675 | A1* | 2/2008 | Kristensen | F03D 80/00 52/745.18 |
| 2009/0223139 | A1* | 9/2009 | Meiners | F03D 80/80 52/745.17 |
| 2010/0308596 | A1* | 12/2010 | Gawrisch | F03D 80/60 290/55 |
| 2010/0313497 | A1* | 12/2010 | Jensen | E04H 12/08 52/651.07 |
| 2011/0037270 | A1* | 2/2011 | Uphues | E04H 12/003 290/55 |
| 2011/0067322 | A1* | 3/2011 | Taschek | E04H 12/003 52/79.7 |
| 2011/0219711 | A1* | 9/2011 | Bagepalli | E04H 12/003 52/651.01 |
| 2011/0258952 | A1* | 10/2011 | Amdaa | E04H 12/003 52/302.1 |
| 2011/0265402 | A1* | 11/2011 | Pfleger | F03D 13/20 52/213 |
| 2011/0298218 | A1* | 12/2011 | Murata | F03D 13/20 290/55 |
| 2015/0052846 | A1* | 2/2015 | Gonz Lez Del Egido | F03D 80/00 52/651.01 |
| 2015/0107179 | A1* | 4/2015 | Unanua Hermoso De Mendoza | F03D 80/50 52/651.01 |
| 2021/0156188 | A1* | 5/2021 | Longeru | E06B 1/006 |

FOREIGN PATENT DOCUMENTS

| | | |
|---|---|---|
| DE | 112011101733 T5 | 3/2013 |
| EP | 2 615 226 A1 | 7/2013 |
| EP | 2913521 B1 | 9/2016 |
| FR | 2484512 A1 | 12/1981 |
| JP | 2013053487 A | 3/2013 |
| WO | 2011/144367 A1 | 11/2011 |

* cited by examiner

TOWER SEGMENT AND MANUFACTURING METHOD

BACKGROUND

Technical Field

The disclosure concerns a tower segment, a tower of a wind turbine, a wind turbine, and a method for manufacturing a tower segment.

Description of the Related Art

Wind turbines are generally known. They generate electrical power from the wind. Modern wind turbines are usually so-called horizontal axis wind turbines in which the rotor axis is arranged substantially horizontally and the rotor blades sweep a substantially vertical rotor field. Wind turbines also usually comprise, as well as a rotor arranged on a nacelle, a tower on which the nacelle with the rotor is arranged so as to be rotatable about an axis oriented substantially vertically. The rotor usually comprises three rotor blades of equal length.

Towers are usually slender structures with a great height, which in particular have a comparatively small extent orthogonally to this height. Towers are often made of concrete and/or steel. The most common types of tower for wind turbines are usually concrete tubular towers or steel tubular towers. Normally, these tubular towers are segmented in the vertical direction and/or in the horizontal circumferential direction. Generally, technical installations are arranged inside the towers of wind turbines. Technical installations may for example be erection platforms, cable strands or ladders.

Towers for wind turbines usually have a door through which an operator can gain access to the interior of the tower. A cutout is made in the tower for such a door. A cutout in a tower constitutes a structural weakness. In particular, the stresses around the recess may be considerable. Usually, a steel strip up to 100 mm thick is welded into the cutout as a door frame. Such a door frame is associated with high costs, and in addition considerable labor is required for inserting and correctly forming this steel strip. Welding of the steel strip has a negative thermal effect on the tower material adjoining the cutout.

BRIEF SUMMARY

Provided is a tower segment, a tower of a wind turbine, a wind turbine and a method for manufacturing a tower segment, which reduce or eliminate one or more of said disadvantages. Provided are one or more techniques which offers better properties with respect to the service life of a tower of a wind turbine in the region of a cutout for a door.

According to a first aspect, provided is a tower segment, in particular for a tower of a wind turbine, comprising a casing segment with an inner casing surface, an outer casing surface and a cutout for a door, wherein the inner casing surface has a first inner reinforcing portion and/or the outer casing surface has an outer reinforcing portion, wherein the inner reinforcing portion and/or the outer reinforcing portion adjoins/adjoin the cutout, and the inner reinforcing portion has an inner reinforcing plate and/or the outer reinforcing portion has an outer reinforcing plate.

The disclosure is based on the knowledge that a door frame for a door in a tower segment for a tower of a wind turbine is not necessary if a reinforcing plate is arranged in the environment of the cutout for the door. It is particularly advantageous if an inner reinforcing plate is arranged on the inner casing surface and an outer reinforcing plate is arranged on the outer casing surface. The inner reinforcing plate and/or the outer reinforcing plate can advantageously influence the stress profile in the region adjoining the cutout.

The inventors have found that by arranging the inner reinforcing plate and/or outer reinforcing plate adjacent to the door cutout, adequate strength and an adequate or improved service life of the component can be achieved. A door frame is therefore not necessary. This saves material, and no welding labor for inserting the door frame is required. In addition, the influence on the casing segment from the welding is avoided, so that a weakening of the casing segment is avoided.

The casing segment has the inner casing surface and the outer casing surface. The casing segment may for example be annular in form. An annular casing segment is distinguished in particular in that this has a substantially annular cross-section orthogonally to a tower longitudinal axis. An annular cross-section means not only a ring but similar geometries, which may in particular be a polygonal cross-section or also an oval cross-section.

The casing segment thus extends preferably in the radial and axial directions, wherein the axial direction is oriented parallel, in particular coaxially, to a longitudinal axis of the tower when the casing segment is properly used. The radial extent of the casing segment is then oriented orthogonally to the axial direction. The inner casing surface is the surface of the casing segment which faces a tower interior when the tower segment is properly used. The outer casing surface is arranged opposite the inner casing surface. This means in particular that this faces away from the tower interior when the tower segment is properly used.

In addition, the casing segment has the cutout for the door. The cutout means in particular a passage opening through which a person can pass through the casing segment. When the tower segment is properly used, this means in particular that a person can access the interior of the tower through the cutout from the outside. The cutout may for example also be used as a wall passage for, e.g., ventilation or coolant hoses.

The inner casing surface comprises the inner reinforcing portion, and/or the outer casing surface comprises the outer reinforcing portion. The inner reinforcing portion and the outer reinforcing portion are in particular regions of the casing segment, namely those regions which adjoin the cutout.

The inner reinforcing portion comprises the inner reinforcing plate, and/or the outer reinforcing portion comprises the outer reinforcing plate. This means in particular that the inner reinforcing plate is arranged in the inner reinforcing portion, and/or that the outer reinforcing plate is arranged in the outer reinforcing portion. The inner reinforcing plate and/or the outer reinforcing plate may adjoin the cutout, and preferably terminate flush therewith, or may also be spaced from the cutout.

The casing segment may also be a divided casing segment. For example, the casing segment may be divided in the axial direction so that a horizontal joint is produced. The joint between the two casing segment parts arranged one above the other may also adjoin the cutout. In addition, the casing segment may also have two or more casing segment parts in the circumferential direction.

In particular, it is preferred that the tower segment consists of or comprises metal, wherein preferably the metal is steel. In addition, it is preferred that the inner reinforcing plate and/or the outer reinforcing plate comprises or consists of metal, wherein preferably the metal is steel.

In a preferred embodiment variant of the tower segment, it is preferred that the inner reinforcing plate and/or the outer reinforcing plate substantially completely surrounds/surround the cutout, and/or an inner contour and/or an outer contour of the inner reinforcing plate and/or the outer reinforcing plate substantially corresponds/correspond to the geometry of the cutout.

"Substantially completely" may for example mean that the reinforcing plate extends completely around the cutout in the shape of a ring, oval and/or race-track. In addition, "substantially completely" may also mean that the inner reinforcing plate and/or the outer reinforcing plate comprises openings. In addition, the inner reinforcing plate and/or the outer reinforcing plate has a cutout, so that the inner and/or outer reinforcing plate may be arranged around the cutout.

It is preferred that the outer contour and/or the inner contour corresponds to the geometry of the cutout. If the inner reinforcing plate and/or the outer reinforcing plate terminates/terminate flush with the cutout, the inner contour substantially corresponds to the geometry of the cutout. The outer contour may also correspond to the geometry of the cutout, wherein this contour has larger dimensions.

In addition, the outer contour of the inner reinforcing plate and/or the outer reinforcing plate may be elongated relative to the geometry of the cutout, for example in the axial direction of the casing segment or also in the circumferential direction. The elongation in the axial direction in fact leads to an inner reinforcing plate and/or an outer reinforcing plate which has a sickle-shaped contour at its ends.

According to a further preferred embodiment variant, it is provided that the inner reinforcing plate and/or the outer reinforcing plate is/are connected, in particular bolted, to the casing segment; and preferably the casing segment, the inner reinforcing plate and the outer reinforcing plate have a plurality of passages with a common passage axis, and fixing elements, in particular bolts, extend through these passages.

The bolts may be secured for example with nuts. Preferably, the inner reinforcing plate and/or the outer reinforcing plate is attached to the casing segment by a plurality of fixing elements, in particular bolts. To achieve an advantageous stiffening of the cutout, it is provided that the bolts are arranged along the inner reinforcing portion and/or along the outer reinforcing portion.

A further preferred refinement of the tower segment is distinguished in that a first bolt region with two or more bolts and a second bolt region with two or more bolts are provided in an upper plate portion of the inner reinforcing plate and/or the outer reinforcing plate above the cutout, and/or in a lower plate portion of the inner reinforcing plate and/or the outer reinforcing plate below the cutout, and preferably bolts in the first bolt region are arranged substantially in a sickle shape, and/or the bolts in the second bolt region are arranged in a circle pattern.

"In an upper plate portion of the inner reinforcing plate above the cutout" means in particular that when the tower segment is in proper use, this upper plate portion is arranged above the cutout in the vertical direction. Similarly, "in an upper plate portion of the outer reinforcing plate above the cutout" has the correspondingly same definition. In a lower plate portion of the inner reinforcing plate and/or in a lower plate portion of the outer reinforcing plate, in each case below the cutout, means that these plate portions are arranged below the cutout in the vertical direction when the tower segment is in proper use. In particular, preferably the first bolt region, in which the bolts are arranged in a circular segment pattern, is arranged adjoining an upper edge of the upper plate portion facing away from the cutout. A circular segment pattern may for example mean semicircular.

Preferably, the second bolt region, in which the bolts are arranged in a circular pattern relative to each other, is arranged in a region between this upper edge and the cutout. "Circular" may also mean that the bolts are arranged in a triangle, a square or a polygonal pattern. Such a fixing with a first bolt region and a second bolt region leads to an advantageous stiffening of the cutout.

In a further preferred embodiment variant, it is provided that the inner reinforcing plate and/or the outer reinforcing plate adjoins/adjoin the cutout such that the inner reinforcing plate and/or the outer reinforcing plate terminates/terminate substantially flush with the casing segment.

In this embodiment variant, the inner plate cutout of the inner reinforcing plate and/or the outer reinforcing plate substantially has the same geometry as the cutout, so that the inner contour corresponds substantially to the geometry of the cutout. This creates a thickening of the cutout in the radial direction of the tower segment, so that advantageously a better distribution of the forces around the cutout is achieved, and furthermore advantageously a door can be arranged.

A further preferred embodiment variant of the tower segment is distinguished in that the cutout has a convex upper cutout portion and/or a convex lower cutout portion, and the inner reinforcing plate and/or the outer reinforcing plate has/have a concave upper plate portion corresponding to the convex upper cutout portion, and/or a concave lower plate portion corresponding to the convex lower cutout portion.

A convex upper cutout portion may for example have a semicircular geometry. Similarly, a convex lower cutout portion may also have a semicircular geometry. Between the convex upper cutout portion and the convex lower cutout portion, the cutout preferably has a rectangular cutout middle portion. The convex upper cutout portion corresponds to the concave upper plate portion, so that for example the inner reinforcing plate with its upper convex cutout portion adjoins the convex upper cutout portion. Alternatively, the inner reinforcing plate may also be arranged so as to be spaced in portions or completely from the convex upper cutout portion. The same applies to the convex lower cutout portion and the corresponding concave lower plate portions of the inner reinforcing plate and/or outer reinforcing plate.

In a further preferred embodiment variant, it is provided that the concave upper plate portion and/or the concave lower plate portion are sickle-shaped. A sickle-shaped plate portion distinguished by a convex side and a concave side, wherein preferably these sides have parabolic contours.

In a further preferred refinement of the tower segment, it may be provided that the cutout has a substantially rectangular cutout middle portion which is preferably arranged between the convex upper cutout portion and the convex lower cutout portion, and the inner reinforcing plate and/or the outer reinforcing plate has/have a plate middle portion, wherein the plate middle portion adjoins the cutout middle portion.

In particular, it is preferred that the plate middle portion of the inner reinforcing plate and/or the outer reinforcing plate has a first plate strip and a second plate strip, wherein the horizontal spacing of the two plate strips corresponds substantially to the horizontal extent of the cutout and their ends are arranged at two mutually spaced ends of the convex upper cutout portion and the convex lower cutout portion. Orthogonally to the axial extent of the casing segment and/orthogonally to the radial extent of the casing segment, the plate strip(s) may have an extent of less than 60 cm, less than 50 cm, less than 40 cm, less than 30 cm, less than 20 cm, or less than 15 cm. In particular, it is preferred that this extent is between 30 cm and 60 cm, wherein it is particularly preferred that it is between 40 cm and 50 cm.

In a further refinement of the tower segment, it may be provided that the concave upper plate portion of the inner reinforcing plate and/or the outer reinforcing plate has at least one first upper collar portion, and/or the concave lower plate portion of the inner reinforcing plate and/or the outer reinforcing plate has at least one first lower collar portion which is preferably bent over, wherein the first upper collar portion and/or the first lower collar portion extends/extend away from the casing segment, and/or the plate middle portion of the inner reinforcing plate and/or the outer reinforcing plate has at least one middle collar portion which is preferably bent over, wherein the middle collar portion extends away from the casing segment.

Such collar portions further increase the stability of the inner reinforcing plate and/or the outer reinforcing plate. In particular, when the tower segment is in proper use, such collar portions result in a greater stiffness in the vertical direction. It is furthermore preferred that the casing segment has a thickness between 30 mm and 60 mm, in particular between 45 mm and 55 mm, and/or the casing segment consists of or comprises steel.

In addition, it is preferred that the inner reinforcing plate and/or the outer reinforcing plate has a thickness between 10 mm and 50 mm, preferably between 20 mm and 45 mm.

The inner reinforcing plate may have two or more portions. For example, the inner reinforcing plate may comprise the concave upper plate portion, the concave lower plate portion and two plate strips as separate elements which are for example welded together. The outer reinforcing plate may also have two or more portions. For example, the outer reinforcing plate may comprise the concave upper plate portion, the concave lower plate portion and two plate strips as separate elements which are for example welded together.

In addition, it may be preferred that the inner reinforcing plate is formed integrally and/or the outer reinforcing plate is formed integrally, and/or the concave upper plate portion and/or the concave lower plate portion and/or the plate middle portion are separate components which are connected together, preferably welded together.

According to a further aspect, provided is a tower of a wind turbine comprising a tower segment according to any of the embodiment variants described above.

According to a further aspect, provided is a wind turbine comprising a tower according to the preceding aspect.

According to a further aspect, provided is a method for manufacturing a tower segment, comprising the steps: provision of a casing segment with a cutout for a door, arrangement of an inner reinforcing plate in an inner reinforcing portion of an inner casing surface of the casing segment facing the tower interior, and/or of an outer reinforcing plate in an outer reinforcing portion of an outer casing surface of the casing segment facing away from the tower interior, wherein the inner reinforcing portion and/or the outer reinforcing portion adjoin the cutout.

The method and its possible refinements comprise features or method steps which in particular make them suitable for use for a tower segment and its refinements. For further advantages, embodiment variants and design details of these further aspects and their possible refinements, reference is made to the description above with respect to the corresponding features and refinements of the tower segment.

BRIEF DESCRIPTION OF THE SEVERAL VIEWS OF THE DRAWINGS

Preferred exemplary embodiments are explained as an example with reference to the appended figures. The drawings show.

In the figures, the same elements or those with substantially the same or similar function are designated with the same reference signs.

DETAILED DESCRIPTION

Figure 1:
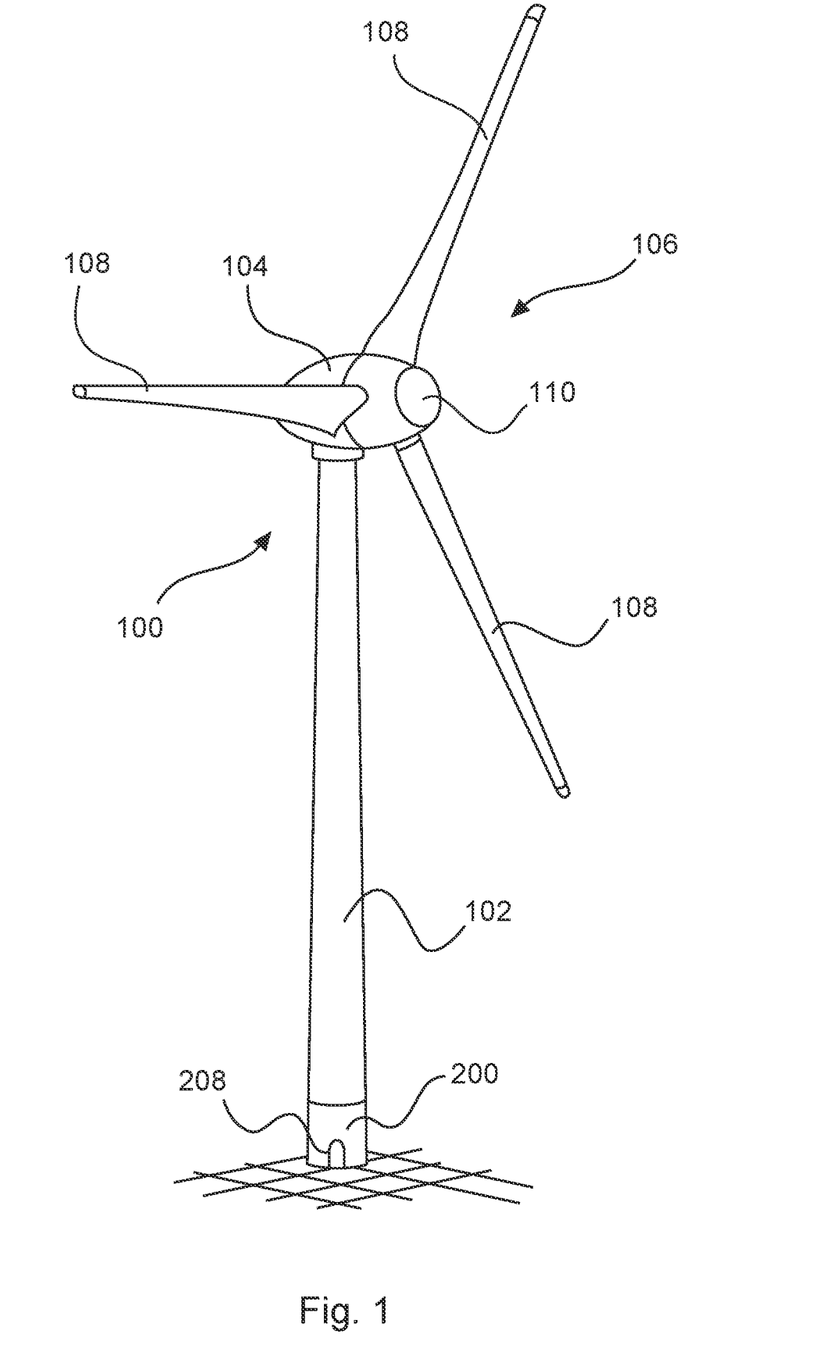
FIG. 1 shows a diagrammatic, three-dimensional view of an exemplary embodiment of a wind turbine.

FIG. 1 shows a diagrammatic, three-dimensional view of an exemplary embodiment of a wind turbine 100. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is set in rotational movement by the wind during operation of the wind turbine 100, and thus also turns an electrodynamic rotor of a generator which is coupled directly or indirectly to the aerodynamic rotor 106. The electrical generator is arranged in the nacelle 104 and generates electrical energy.

The tower 102 comprises a tower segment 200 comprising a casing segment with an inner casing surface, an outer casing surface and a cutout 208 for a door, wherein the inner casing surface has a first inner reinforcing portion and/or the outer casing surface has an outer reinforcing portion, wherein the inner reinforcing portion and the outer reinforcing portion adjoin the cutout, and the inner reinforcing portion has an inner reinforcing plate and/or the outer reinforcing portion has an outer reinforcing plate.

Figure 2:
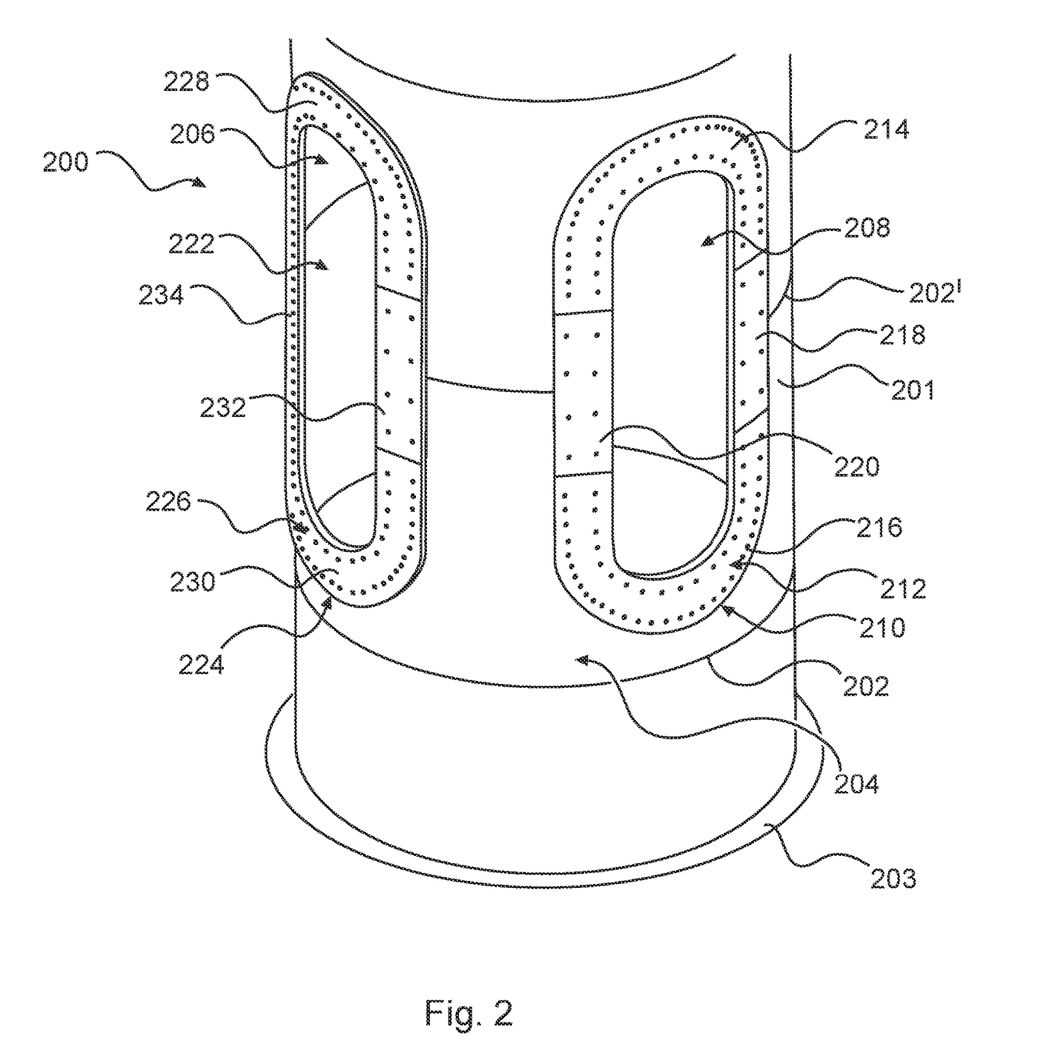
FIG. 2 shows a diagrammatic, three-dimensional view of an exemplary embodiment of a tower segment.

FIG. 2 shows a diagrammatic, three-dimensional view of an exemplary embodiment of a tower segment 200. The tower segment 200 adjoins a foundation flange 203. The tower segment 200 has a casing segment 201, wherein this casing segment has an outer casing surface 204 and an inner casing surface 206. The inner casing surface 206 can be seen in the present figure through the cutouts 208, 222. The casing segment 201 comprises several casing segment parts which abut each other at butt joints 202, 202'. The casing segment 201 furthermore has the first cutout 208 and the second cutout 222. Casing segments 201 with only one cutout are also conceivable. The cutouts 208, 222 are in particular arranged and configured such that they may serve as an entrance for a person into the interior of the casing segment 201.

In the region adjacent to the first cutout 208, the casing segment 201 has a first outer reinforcing portion 210. A first outer reinforcing plate 212 is arranged in the first outer reinforcing portion 210. The first outer reinforcing portion 210 is characterized in particular in that it comprises the first outer reinforcing plate 212.

The first outer reinforcing plate 212 comprises the first upper plate portion 214, the first lower plate portion 216 and two first outer plate middle portions 218, 220. The first upper plate portion 214 of the first outer reinforcing plate 212 is arranged adjacent to a convex upper cutout portion of the cutout 208. The first lower plate portion 216 of the first outer reinforcing plate 212 adjoins a convex lower cutout portion of the cutout 208. The first upper plate portion 214 and the first lower plate portion 216 are U-shaped in the present case. The legs of the U-shaped geometries are connected to the respective ends of the outer plate middle portions 218, 220.

The second cutout 222 is similarly surrounded by a second outer reinforcing portion 224 in which a second outer reinforcing plate 226 is arranged. The second outer reinforcing plate 226 comprises a second upper plate portion 228, a second lower plate portion 230 and second outer plate middle portions 232, 234.

Similarly, on the inner casing surface 206, a respective reinforcing portion is arranged around the cutout 208, 222, wherein a reinforcing plate again reinforces the cutout 208, 222.

Figure 3:
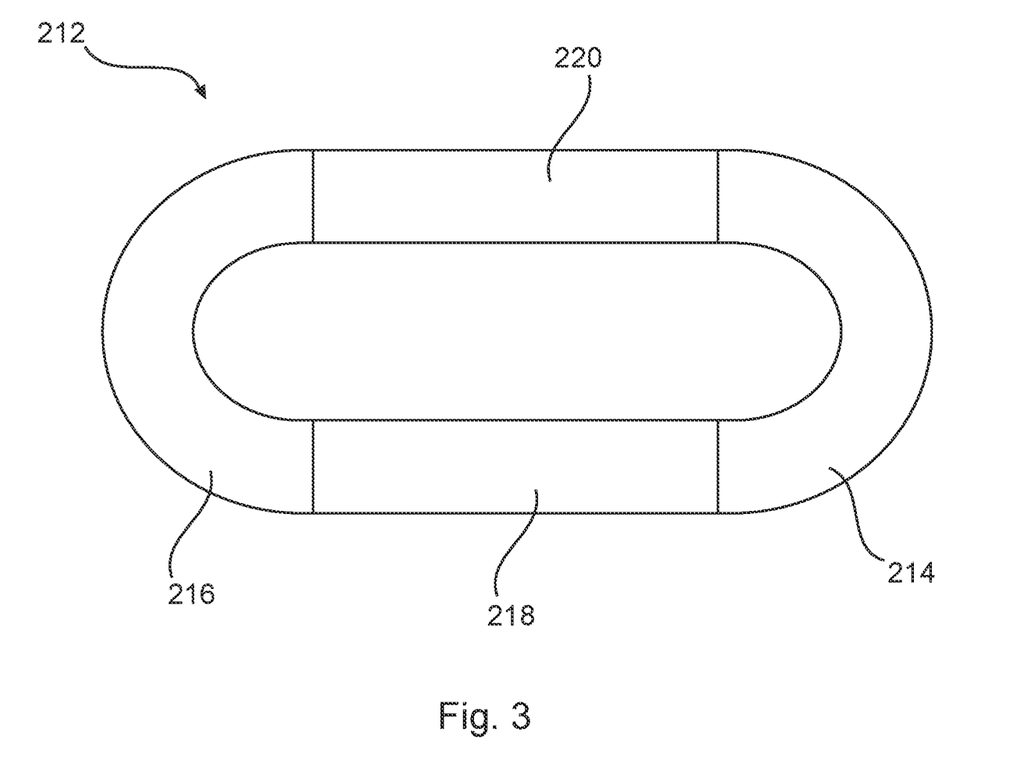
FIG. 3 shows a diagrammatic, two-dimensional view of a reinforcing plate.

FIG. 3 shows a diagrammatic, two-dimensional view of the reinforcing plate 212, wherein in particular the inner contour and the outer contour of the reinforcing plate 212 are shown. The first outer reinforcing plate 212 comprises the first outer plate middle portions 218, 220 arranged in parallel. The first outer plate middle portions 218, 220 connect the legs of the U-shaped or semicircular first upper and lower plate portions 214, 216.

Figure 4:
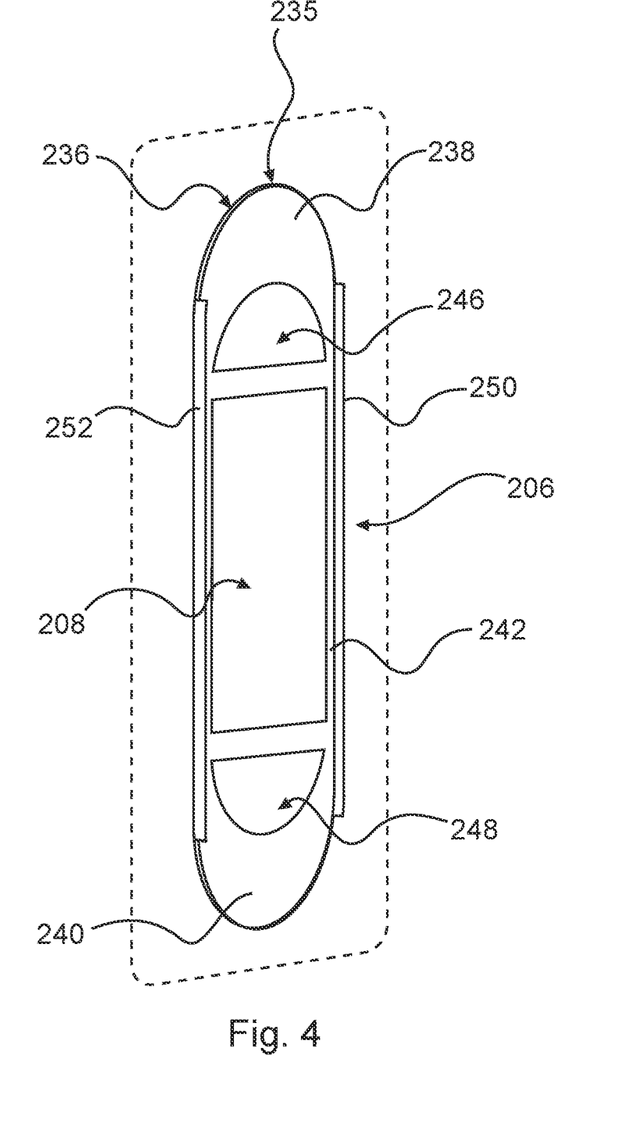
FIG. 4 shows a diagrammatic, three-dimensional view of a casing segment.

FIG. 4 shows a diagrammatic, three-dimensional view of the casing segment 201. The inner casing surface 206 has an inner reinforcing portion 235 adjacent to the first cutout 208. A first inner reinforcing plate 236 is arranged in the inner reinforcing portion 235. The first inner reinforcing plate 236 also comprises a first upper plate portion 238, a first lower plate portion 240 and two first plate middle portions 242, 244.

The geometry of the first upper plate portion 238 and the first lower plate portion 240 differs from the outer upper and lower plate portions described above in that the geometry is rather sickle-shaped. The first upper plate portion 238 adjoins a convex upper cutout portion 246 of the cutout 208. The first lower plate portion 240 adjoins a convex lower cutout portion 248.

To further increase the reinforcing effect of the first inner reinforcing plate 236, this has a first collar portion 250 and a second collar portion 252. The first and second collar portions 250, 252 are preferably parts of the first inner reinforcing plate 236, in particular of the first upper plate portion 238, the first lower plate portion 240 and the first plate middle portions 242, 244, wherein preferably the plate material has been bent over.

The collar portions 250, 252 protrude radially inwardly. The collar portions 250, 252 extend away from the casing segment 201. For example, a substantially right angle may exist between the collar portions 250, 252 and the inner casing surface 206. Alternatively, an angle different from 90° may be provided, for example 120°.

Figure 5:
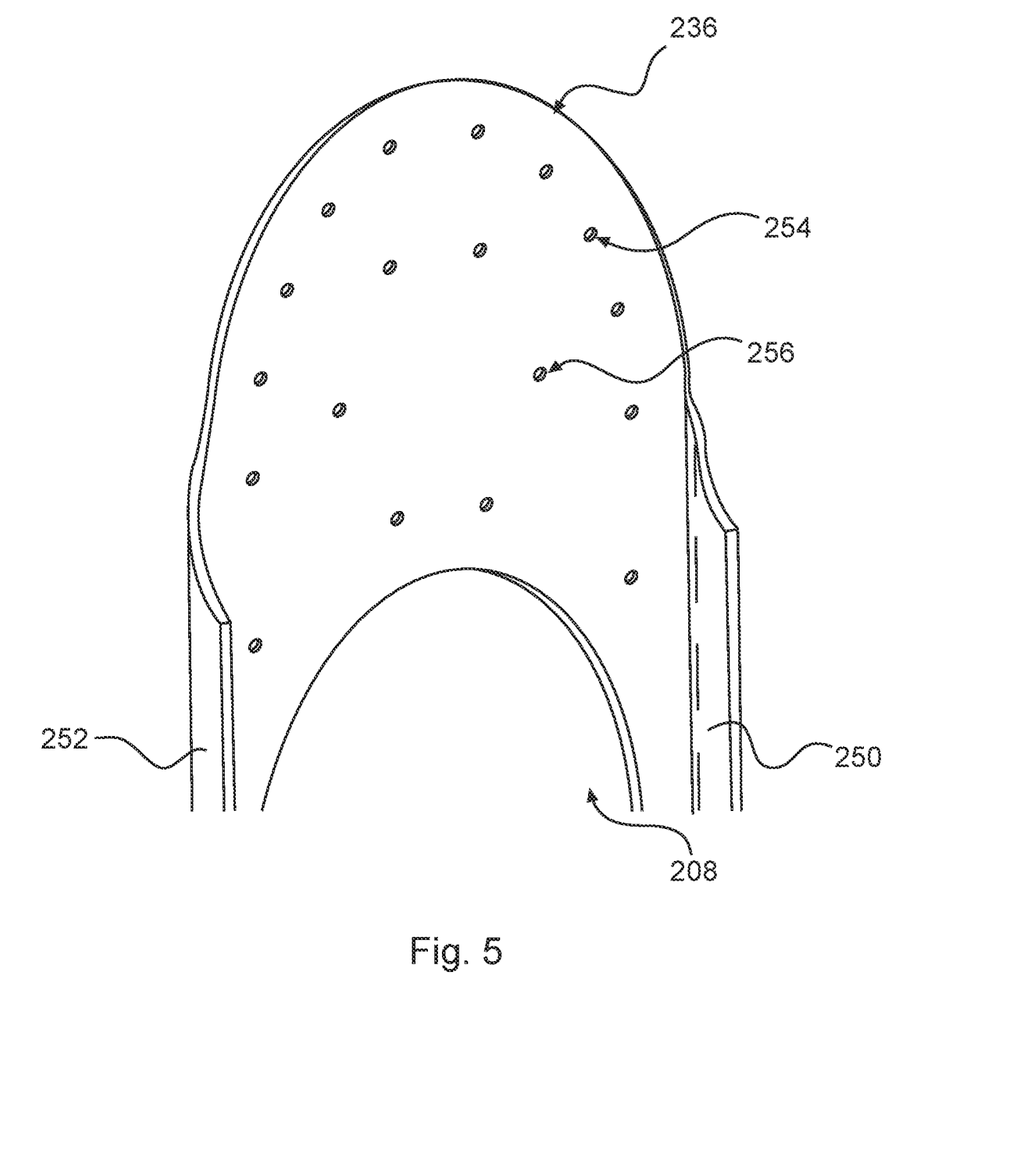
FIG. 5 shows a further diagrammatic, three-dimensional view of a tower segment.

FIG. 5 shows a diagrammatic, three-dimensional, detail view of the tower segment. This detail view of the first inner reinforcing plate 236 shows the sickle-shaped contour or geometry of the first upper plate portion 238. As well as the collar portions 250, 252, in particular the fixing of the first inner reinforcing plate 236 to the casing segment 201 can be seen. A first bolt region 254 is provided in which the bolts are arranged in a circle-segment pattern or also a sickle shape. In addition, in a second bolt region 236, a circular arrangement of the bolts is provided.

Figure 6:
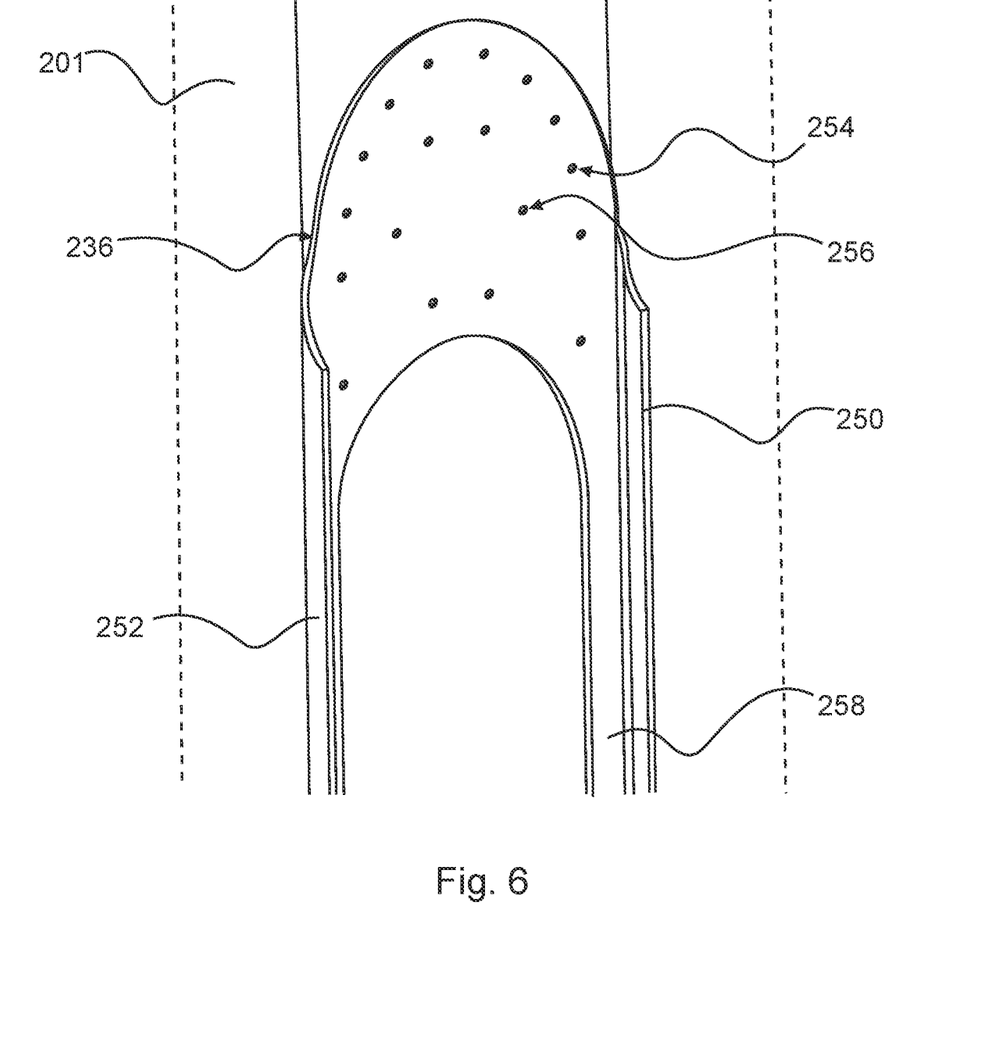
FIG. 6 shows a further diagrammatic, three-dimensional view of a tower segment.

FIG. 6 shows a further diagrammatic, three-dimensional view of a tower segment. FIG. 6 in particular shows that the tower segment may also be provided for not only annular tower cross-sections but also for polygonal cross-sections. The split first inner reinforcing plate 238 comprises amongst others the inner plate middle portion 258.

Figure 7:
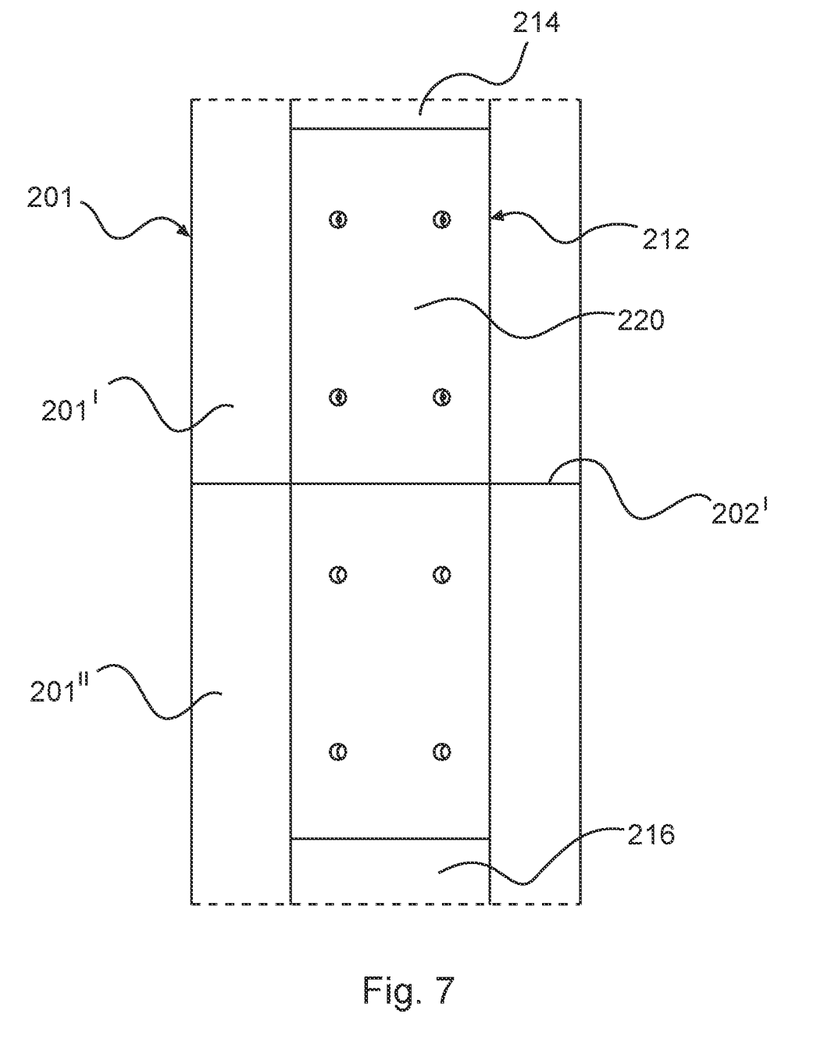
FIG. 7 shows a diagrammatic, two-dimensional detail view of a tower segment.

FIG. 7 shows a diagrammatic, two-dimensional view of a tower segment. The two casing segment parts 201', 201" abut each other at the butt joint 202'. The first outer plate middle portion 220 is continuous in the region of the butt joint 202'. This achieves a further stiffening of the tower segment.

Figure 8:
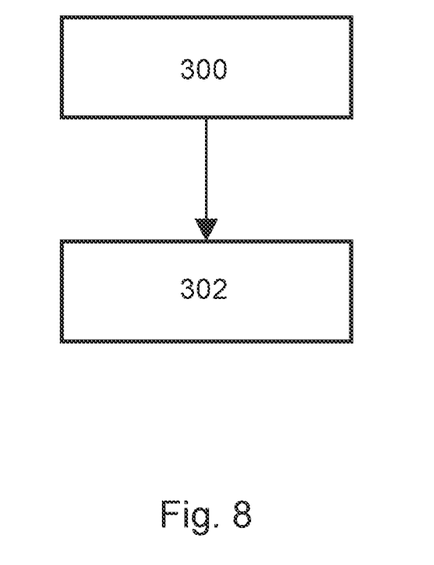
FIG. 8 shows a diagrammatic illustration of a method.

FIG. 8 shows a diagrammatic illustration of a method. In step 300, a casing segment 201 with a cutout 208, 222 for a door is provided. In step 302, an inner reinforcing plate 236 is arranged in an inner reinforcing portion 235 of an inner casing surface 206 of the casing segment 201 facing the tower interior, and an outer reinforcing plate 212, 226 is arranged in an outer reinforcing portion 210, 224 of an outer casing surface 204 of the casing segment 201 facing away from the tower interior, wherein the inner reinforcing portion 235 and/or the outer reinforcing portion 210, 224 adjoin the cutout 208, 222.

LIST OF REFERENCE SIGNS

100 Wind turbine
102 Tower
104 Nacelle
106 Rotor
108 Rotor blades
110 Spinner
200 Tower segment
201 Casing segment
201', 201" Casing segment portions
202', 202" Butt joint
203 Foundation flange
204 Outer casing surface
206 Inner casing surface
208 First cutout
210 First outer reinforcing portion
212 First outer reinforcing plate
214 First upper plate portion
216 First lower plate portion
218, 220 First outer plate middle portions
222 Second cutout
224 Second outer reinforcing portion
226 Second outer reinforcing plate
228 Second upper plate portion
230 Second lower plate portion
232 Second outer plate middle portion
234 Second outer plate middle portion
235 First inner reinforcing portion
236 First inner reinforcing plate
238 First upper plate portion
240 First lower plate portion
242, 244 First plate middle portions
246 Convex upper cutout portion
248 Convex lower cutout portion
250 First collar portion
252 Second collar portion 254 First bolt region
256 Second bolt region
258 Inner plate middle portion The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tower segment, comprising:
a casing segment having an inner casing surface, an outer casing surface, and a cutout for a door,
wherein the inner casing surface has an inner reinforcing portion and the outer casing surface has an outer reinforcing portion, wherein the inner reinforcing portion and the outer reinforcing portion adjoin the cutout,
wherein the inner reinforcing portion has an inner reinforcing plate and the outer reinforcing portion has an outer reinforcing plate, and
wherein at least one of a plate middle portion of the inner reinforcing plate or the outer reinforcing plate has a middle collar portion, wherein the middle collar portion of at least one of the plate middle portion of the inner reinforcing plate or the outer reinforcing plate extends in a direction that is away from the casing segment and does not extend into the cutout.

2. The tower segment according to claim 1, wherein:
the inner reinforcing plate and the outer reinforcing plate completely surround the cutout; and
an inner contour and an outer contour of the inner reinforcing plate and the outer reinforcing plate substantially correspond to a geometry of the cutout.

3. The tower segment according to claim 1, wherein:
the inner reinforcing plate and the outer reinforcing plate are coupled to the casing segment; and
the casing segment, the inner reinforcing plate and the outer reinforcing plate have a plurality of passages with a common passage axis, and wherein fixing elements extend through the plurality of passages.

4. The tower segment according to claim 1, wherein:
a first bolt region with a plurality of bolts and a second bolt region with a plurality of bolts are in an upper plate portion of the inner reinforcing plate and the outer reinforcing plate above the cutout or in a lower plate portion of the inner reinforcing plate and the outer reinforcing plate below the cutout; and
wherein the plurality of the bolts in the first bolt region are arranged substantially in a sickle shape, and the plurality of bolts in the second bolt region are arranged substantially in a circle pattern.

5. The tower segment according to claim 1, wherein at least one of the inner reinforcing plate or the outer reinforcing plate adjoins the cutout such that at least one of the inner reinforcing plate or the outer reinforcing plate terminates substantially flush with the casing segment.

6. The tower segment according to claim 1, wherein:
the cutout has a convex upper cutout portion and a convex lower cutout portion; and
the inner reinforcing plate and the outer reinforcing plate have a respective concave upper plate portion corresponding to the respective convex upper cutout portion, and a respective concave lower plate portion corresponding to the respective convex lower cutout portion.

7. The tower segment according to claim 6, wherein at least one of the concave upper plate portion or the concave lower plate portion are sickle-shaped.

8. The tower segment according to claim 6, wherein:
the cutout has a substantially rectangular cutout middle portion arranged between the convex upper cutout portion and the convex lower cutout portion; and
the inner reinforcing plate and the outer reinforcing plate have plate middle portions, wherein the plate middle portions adjoin the cutout middle portion.

9. The tower segment according to claim 8, wherein:
the plate middle portion of the inner reinforcing plate or the outer reinforcing plate has a first plate strip and a second plate strip; and
a horizontal spacing of the first and second plate strips corresponds substantially to a horizontal extent of the cutout and ends of the first and second plate strips are arranged at two mutually spaced ends of the convex upper cutout portion and the convex lower cutout portion.

10. The tower segment according to claim 8, wherein:
the concave upper plate portion of the inner reinforcing plate and the outer reinforcing plate has at least one first upper collar portion, wherein the concave lower plate portion of the inner reinforcing plate and the outer reinforcing plate has at least one first lower collar portion which is bent; and/or
the first upper collar portion and the first lower collar portion extend away from the casing segment.

11. The tower segment according to claim 6, wherein:
the inner reinforcing plate is a single integral piece and the outer reinforcing plate is a single integral piece; and
the concave upper plate portion, the concave lower plate portion, and the plate middle portions are separate components and are connected together.

12. The tower segment according to claim 1, wherein the casing segment has a thickness between 30 mm and 60 mm.

13. The tower segment according to claim 12, wherein the thickness of the casing segment is between 45 mm and 55 mm.

14. The tower segment according to claim 13, wherein at least one of the inner reinforcing plate or the outer reinforcing plate has a thickness between 20 mm and 45 mm.

15. The tower segment according to claim 1, wherein the casing segment consists of or comprises steel.

16. The tower segment according to claim 1, wherein at least one of the inner reinforcing plate or the outer reinforcing plate has a thickness between 10 mm and 50 mm.

17. A tower, comprising:
the tower segment according to claim 1.

18. A wind turbine, comprising:
the tower according to claim 17.

19. A method for manufacturing a tower segment, comprising:
forming a casing segment with a cutout for a door; and
arranging an inner reinforcing plate in an inner reinforcing portion of an inner casing surface of the casing segment facing an interior of the tower, and arranging an outer reinforcing plate in an outer reinforcing portion of an outer casing surface of the casing segment facing away from the tower interior, wherein the inner reinforcing portion and the outer reinforcing portion adjoin the cutout,
wherein at least one of a plate middle portion of the inner reinforcing plate or the outer reinforcing plate has a middle collar portion, wherein the middle collar portion of at least one of the plate middle portion of the inner reinforcing plate or the outer reinforcing plate extends in a direction that is away from the casing segment and does not extend into the cutout.

* * * * *